United States Patent [19]
Camberlin et al.

[11] Patent Number: 6,160,055
[45] Date of Patent: Dec. 12, 2000

[54] GRAFTED POLYOLEFINS CONTAINING A SUCCINIMIDE RING SUBSTITUTED ON THE NITROGEN ATOM BY A REACTIVE GROUP

[75] Inventors: Yves Camberlin, Caluire; Serge Gonzalez, Decines; Frédérique Hauviller, Saint Genis Laval, all of France

[73] Assignee: Institut Francais de Petrole, Rueil-Malmaison, France

[21] Appl. No.: 08/988,981

[22] Filed: Dec. 11, 1997

[30] Foreign Application Priority Data

Dec. 12, 1996 [FR] France ................................. 96 15473

[51] Int. Cl.$^7$ ........................................... C08F 8/00
[52] U.S. Cl. ................... 525/326.7; 525/282; 525/326.8; 525/327.6; 525/385
[58] Field of Search ..................... 525/282, 385, 525/326.7, 326.8, 327.6

[56] References Cited

U.S. PATENT DOCUMENTS

| | | |
|---|---|---|
| 4,632,962 | 12/1986 | Gallucci .................................. 525/282 |
| 4,966,947 | 10/1990 | Fry et al. ................................. 525/282 |
| 5,075,386 | 12/1991 | Vanderbilt ............................. 525/327.3 |
| 5,466,753 | 11/1995 | Marczinke et al. ..................... 525/193 |

FOREIGN PATENT DOCUMENTS

| | | |
|---|---|---|
| 2 690 266 | 10/1993 | France . |
| 37 12 120 | 10/1987 | Germany . |
| 43 33 670 | 4/1995 | Germany . |
| 1160031 | 7/1969 | United Kingdom . |

*Primary Examiner*—Bernard Lipman
*Attorney, Agent, or Firm*—Millen White Zelano & Branigan

[57] ABSTRACT

A polymer contains a succinimide ring substituted on the nitrogen atom by a reactive group, where the ring is supported either by the main chain or by a side chain, resulting from reacting at least one polyolefin with at least one compound containing a maleimide ring substituted on the nitrogen atom by a reactive group with formula —R—(X)$_n$ where X is a reactive group, n is a whole positive number equal to 1 or more and R is a residue containing at least one carbon atom, and with at least one polyepoxide containing at least two epoxy groups in its molecule. These polymers can be used for the production of co-extruded products, multi-layered materials, surface coatings and polymer alloys.

13 Claims, No Drawings

GRAFTED POLYOLEFINS CONTAINING A SUCCINIMIDE RING SUBSTITUTED ON THE NITROGEN ATOM BY A REACTIVE GROUP

The present invention concerns polymers containing at least one succinimide ring substituted on the nitrogen atom by a reactive group, where the ring is supported either by the main chain or by a side chain. In the present invention, the term "reactive group" means any group which can open an oxirane ring and form a bond between that group and a compound comprising an oxirane ring.

The properties of the polymers of the present invention are improved compared with polymers which do not contain a succinimide ring substituted on the nitrogen atom by a reactive group. In particular, they have improved adhesive properties and can thus be used as surface coatings. They are also more heat resistant than the polymers from which they are derived.

The polymers of the present invention have reactive groups which allow them to be used in the production of polymer alloys.

The polymers of the present invention can be defined as polyolefins containing at least one succinimide ring substituted on the nitrogen atom by a reactive group, the ring being supported either by the main chain or by a side chain, resulting from reacting at least one polyolefin with at least one compound containing a maleimide ring substituted on the nitrogen atom by a reactive group with formula —R—(X)$_n$ where X is a reactive group, n is a whole positive number equal to 1 or more and R is a residue containing at least one carbon atom, and with at least one polyepoxide containing at least two epoxy groups in its molecule. Usually, n equals 1 and in this case the compound containing a maleimide ring used in the present invention is represented by formula 1 below:

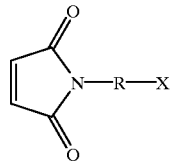

FORMULA I

The reactive group —X is generally selected from a hydroxyl group, a carboxylic group, a carboxamide group, a carboxylic acid halide group, a thiol group, a thiocarboxylic group, an amino group, a halogen, an epoxy group, and an esterified carboxylic group in which the ester portion contains a reactive group. When a plurality —X groups are present, they can be identical or different.

Very often, compounds containing a reactive group selected from a carboxylic group, a carboxamide group, and an acid halide group, for example a carboxylic acid chloride group, are used. The preferred group is the carboxylic group.

The group —R— is normally selected from the group formed by saturated or unsaturated, substituted or unsubstituted aliphatic hydrocarbons, and substituted or unsubstituted aromatic groups. In general, unsubstituted groups are preferred, normally groups containing at least one aromatic nucleus. Examples of groups which are frequently used are benzenic groups which are bonded in the ortho, meta or para position to the nitrogen atom and to the reactive group —X. Normally, the para or meta form is used.

The polyolefins used to produce the polymers of the present invention can be any of the polyolefins which are known to the skilled person. Preferably, polyolefins obtained from at least one unsaturated monomer containing one or more unsaturated bonds are used, generally selected from the group formed by ethylene, propene, butenes and norbornenes. Thus these polyolefins can be formed by homopolymerisation or copolymerisation of at least two monomers.

In one particularly preferred form, the polyolefin is selected from the group formed by high density polyethylenes and ethylene copolymers which are preferably constituted by at least 90% of ethylene moieties and at most 10% of a $C_3$ to $C_8$ olefin. More particularly, high density polyolefins which preferably have a density of about 0.9 to about 0.97 and a fusion index measured in accordance with standard ASTM D-1238 of about 0.2 to about 100 (measurements carried out under a 19.6 kg load at 190° C.).

The polyepoxide containing at least two epoxy groups in its molecule is normally selected from the group formed by aliphatic polyepoxides, cycloaliphatic polyepoxides and aromatic polyepoxides. Examples of the most frequently used compounds are the diglycidylether of bis-phenol-A or that of bis-phenol-F, triglycidylether-isocyanurate and/or triglycidylether-cyanurate and/or triglycidyl-cyanurate and/or triglycidyl-isocyanurate or mixtures of at least two of these compounds. The epoxy-containing compounds containing at least two epoxy groups cited in U.S. Pat. No. 4,921,047 can also be used in the present invention. The disclosure of that patent should be considered to be incorporated into the present description by reference.

The polymers of the present invention are normally prepared by two distinct methods. The first method consists of bringing a molten polyolefin into contact with at least one compound containing a maleimide ring substituted on the nitrogen atom by a reactive group and at least one compound containing at least two epoxy groups in its molecule in a mixer or extruder. This preparation can be carried out with or without a radical initiator. Examples of radical initiators are peroxides. Preferably, a radical initiator is not used in the present invention. This possibility of forming, without a radical initiator, polymers containing a succinimide ring substituted on the nitrogen atom by a reactive group, the ring being supported either by the principal chain or by a side chain, constitutes a distinct advantage of the present invention which avoids the risk of cleavage and cross-linking of the polymer. The reaction temperature is normally in the range from about the fusion temperature of the polyolefin to about 300° C. This temperature is usually about 200° C. to about 260° C. The reaction time is relatively short and normally does not exceed 10 minutes. An extrusion-reaction system is normally preferable as it produces very good results.

The second method for the preparation of the polymers of the present invention consists of, in a step a), bringing a molten polyolefin into contact with at least one compound containing a maleimide ring substituted on the nitrogen atom by a reactive group in a mixer or in an extruder, then in a step b) introducing at least one compound containing at least two epoxy groups in its molecule into the mixer or extruder. This preparation can be carried out with or without a radical initiator. Examples of radical initiators are peroxides. Preferably, a radical initiator is not used in the present invention. This possibility of forming, without a radical initiator, polymers containing a succinimide ring substituted on the nitrogen atom by a reactive group, the ring being supported either by the principal chain or by a side chain, constitutes a distinct advantage of the present invention which avoids the risk of cleavage and cross-linking of the polymer. The reaction temperature in step a) is normally in the range from about the fusion temperature of the polyolefin to about 300° C. This temperature is usually about 200° C. to about 260° C. The reaction time is relatively short and normally does not exceed 10 minutes for each step. An extrusion-reaction system is normally preferable as it produces very good results. Identical temperatures are normally used in both steps.

The present invention also concerns the use of the polymers described above for the production of a surface coating. These polymers, with good adhesive properties, are more suitable than the starting polymers for this application. These polymers can also be used to produce alloys of polymers, in which the reactive function improves formation of the alloys. They can also be used for the production of co-extruded products. They can also be used for the production of multi-layered materials.

The following examples illustrate the invention without limiting its scope.

EXAMPLE 1

This example describes the preparation of a grafted polymer in a mixer.

40 g of medium density polyethylene (d=0.954) sold by FINA under the trade name Finathene 3802®, 0.4 g of 4-maleimidobenzoic acid (AMB) and 1.84 g of Araldite GT 7071® sold by CIBA-GEIGY (with an epoxy number of 2 and an epoxy equivalent of 500) were introduced into a Haake Rheocord® kneader. The working temperature was 240° C., the blade rotation rate was 64 revolutions per minute (rpm). After 5 minutes of mixing at 240° C., the reaction product was cooled in water and dried at 60° C. under 1 millimeter (mm) of mercury for 8 hours. The product obtained was used for adhesion tests, the results of which are shown in Table 1 below.

EXAMPLE 2

This example describes the preparation of a grafted polymer using a CLEXTRAL co-rotating twin screw extruder sold under the trade name BC21, with a length/diameter ration of 28, a screw diameter of 25 mm and provided with a 4 mm diameter die.

Granules of Finathene 3802® polyethylene, a quantity corresponding to 1% by weight of AMB with respect to the polyethylene and a corresponding equimolar quantity of Araldite GT 7071 were simultaneously introduced into the supply hopper of the extruder.

The total rate at which the products were introduced into the extruder was 5 kilograms per hour and the reaction temperature in the extruder was held at 240° C. The screw rotation speed was 100 rpm, the residence time was 1 minute. The rod leaving the die was cooled in water at 25° C., granulated and dried for the adhesion tests.

EXAMPLE 3

This example describes the preparation of a grafted polymer in a mixer using two successive steps.

40 g of Finathene 3802® and 0.4 g of AMB were introduced into a Haake Rheocorde® kneader. The working temperature was 240° C. and the blade rotation rate was 64 revolutions per minute (rpm). After 2 minutes of mixing at 240° C., 1.84 g of Araldite GT 7071® was added and the temperature was kept at 240° C. for another 5 minutes after this addition. The reaction product obtained at the end of the second step was cooled in water and dried at 60° C. under 1 millimeter (mm) of mercury for 8 hours. The product obtained was used for adhesion tests, the results of which are shown in Table 1 below.

EXAMPLE 4

Adhesion tests were carried out on the various products using aluminium metal specimens.

The adhesive properties of the compositions were determined using the ASTM D 1002 method.

The test procedure comprised preparing metal specimens. 600 $cm^3$ of chromic-sulphuric acid mixture was prepared and a series of specimens was placed on a support then immersed in a receptacle containing the chromic-sulphuric acid mixture which was held at a temperature of 60° C. After 15 minutes, the samples were withdrawn. They were rinsed with plenty of water and oven dried for 2 hours at 80° C.

An adhesive bonding surface 25.4 mm×12.7 mm was delimited on a specimen and a maximum adhesive joint thickness of $125 \times 10^{-6}$ m was delimited using shims. Two specimens were adhesively bonded using a DARRAGON table press preheated to 200° C., applying a pressure of 0.5 MPa for 5 minutes.

A traction test was then carried out with an INSTRON type machine provided with a measuring head of $10^5$ Newton. The rate of displacement of the beam was 1 mm/min.

The results of the adhesion tests are given in Table 1 below. The values given correspond to an average value obtained over 10 successive tests. By way of comparison, tests were carried out on medium density polyethylene HDPE Finathene 3802® and with a terpolymer sold by ORKEM under reference 3210® with a number average molecular mass of 15050 and a polydispersity index of 5.3.

TABLE 1

| Nature of tested polymer | Breaking load in kiloNewton (kN) | Nature of break |
| --- | --- | --- |
| HDPE | 2.1 | adhesive |
| Lotader 3210 ® | 2.7 | adhesive |
| Product from example 1 | 3.9 | cohesive |
| Product from example 2 | 4.2 | cohesive |
| Product from example 3 | 4.0 | cohesive |

The large increase in the maximum load necessary to cause breaking when using the products of the present invention can be seen, also the difference in the nature of the break which occurs in the mass and which demonstrates the large improvement in adhesion obtained with the products of the invention.

What is claimed is:

1. A high density ethylene polymer product containing at least one succinimide ring substituted on the nitrogen atom by a carboxylic group, the ring being supported either by the main chain or by a side chain, said product resulting from reacting a least one high density ethylene polymer with at least one compound containing a maleimide ring substituted on the nitrogen atom by a carboxylic group, n is a whole positive number equal to 1 or more and R is a residue containing at least two epoxy groups in its molecule.

2. A high density ethylene polymer according to claim 1, in which group R is a saturated or unsaturated, substituted or unsubstituted aliphatic hydrocarbon or a substituted or unsubstituted aromatic group.

3. A high density ethylene polymer according to claim 1, wherein the high density ethylene polymer is a high density ethylene polymer obtained from at least one unsaturated monomer.

4. A high density ethylene polymer according to claim 1, in which the group —R— is a benzene residue and the group —X is in the position para to the nitrogen atom.

5. A high density ethylene polymer according to claim 1, in which the polyepoxide containing at least two epoxy groups is selected from the group consisting of aliphatic polyepoxides, cycloaliphatic polyepoxides and aromatic polyepoxides.

6. A process for the preparation of a high density ethylene polymer according to claim 1 comprising contacting a molten high density ethylene polymer in a mixer or extruder with at least one compound containing a maleimide ring substituted on the nitrogen atom by a carboxylic group and with at least one polyepoxide containing at least two epoxy groups.

7. A process for the preparation of a high density ethylene polymer according to claim 1 comprising in a step a), contacting a molten high density ethylene polymer in a mixer or in an extruder with at least one compound containing a maleimide ring substituted on the nitrogen atom by a carboxylic group, then in a step b) introducing at least one compound containing at least two epoxy groups into the mixer or extruder.

8. A high density ethylene polymer according to claim 1 in the form of a surface coating.

9. A polymer alloy comprising a high density ethylene polymer according to claim 1.

10. A co-extruded product comprising a high density ethylene polymer according to claim 1.

11. A multi-layered product comprising a high density ethylene polymer according to claim 1.

12. A high density ethylene polymer according to claim 5, wherein said polyepoxide is the diglycidylether of bis-phenol-A or that of bis-phenol-F, triglycidyletherisocyanurate, triglycidylethercyanurate, triglycidylcyanurate, triglycidylisocyanurate or mixtures of at least two of these compounds.

13. A process for the preparation of a high density ethylene polymer according to claim 1, consisting essentially of in a step a), contacting a molten high density ethylene polymer in a mixer or in an extruder with at least one compound containing a maleimide ring substituted on the nitrogen atom by a carboxylic group, then in a step b) introducing at least one compound containing at least two epoxy groups into the mixer or extruder.

* * * * *